(12) United States Patent
Sato et al.

(10) Patent No.: US 7,308,120 B2
(45) Date of Patent: Dec. 11, 2007

(54) IDENTIFICATION OF FACIAL IMAGE WITH HIGH ACCURACY

(75) Inventors: Miki Sato, Minato-ku (JP); Junichi Funada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/615,182

(22) Filed: Dec. 22, 2006

(65) Prior Publication Data

US 2007/0110286 A1 May 17, 2007

Related U.S. Application Data

(62) Division of application No. 10/400,797, filed on Mar. 28, 2003, now Pat. No. 7,248,721.

(30) Foreign Application Priority Data

Mar. 29, 2002 (JP) ............................. 2002-096044

(51) Int. Cl.
*G06K 9/00* (2006.01)

(52) U.S. Cl. .................... 382/118; 340/5.53; 340/5.83; 382/103; 382/218

(58) Field of Classification Search ............... 340/5.53, 340/5.83; 382/118, 209, 274, 103, 218
See application file for complete search history.

(56) References Cited

U.S. PATENT DOCUMENTS 5,550,928 A * 8/1996 Lu et al. ..................... 382/116

| | | | | |
|---|---|---|---|---|
| 5,715,325 A | * | 2/1998 | Bang et al. | 382/118 |
| 6,108,437 A | * | 8/2000 | Lin | 382/118 |
| 6,809,887 B1 | * | 10/2004 | Gao et al. | 359/725 |
| 2004/0165754 A1 | * | 8/2004 | Tabata | 382/118 |
| 2005/0063566 A1 | * | 3/2005 | Beek et al. | 382/115 |
| 2007/0092245 A1 | * | 4/2007 | Bazakos et al. | 396/427 |

FOREIGN PATENT DOCUMENTS

| | | | |
|---|---|---|---|
| EP | 1681855 A2 | * | 7/2006 |
| JP | 63-191282 A | | 8/1988 |
| JP | 6-180751 A | | 6/1994 |
| JP | 7-73298 A | | 3/1995 |
| JP | 8-83342 A | | 3/1996 |
| JP | 8-107560 A | | 4/1996 |
| JP | 8-116488 A | | 5/1996 |
| JP | 9-106470 A | | 4/1997 |
| JP | 9-212644 A | | 8/1997 |
| JP | 10-137223 A | | 5/1998 |
| JP | 10-312462 A | | 11/1998 |

(Continued)

*Primary Examiner*—Gregory M Desire
(74) *Attorney, Agent, or Firm*—Sughrue Mion, PLLC

(57) ABSTRACT

A facial image identifying apparatus checks a facial image of a user captured by an image capturing unit such as a camera or the like against facial images of registered users for thereby identifying the user. When the facial image identifying apparatus starts to detect a facial image of an examinee user, it determines whether a situation of the image captured by the image capturing unit is appropriate to detect the facial image. If the situation is judged as being inappropriate, then information representing that the situation is inappropriate is presented to the examinee user. Based on the presented information, the examinee user can make an action to improve the situation of the captured image.

10 Claims, 5 Drawing Sheets

FOREIGN PATENT DOCUMENTS

| | | |
|---|---|---|
| JP | 11-96477 A | 4/1999 |
| JP | 11-167632 A | 6/1999 |
| JP | 11-175730 A | 7/1999 |
| JP | 11-313244 A | 11/1999 |
| JP | 2000-5150 A | 1/2000 |
| JP | 2000-222576 A | 8/2000 |
| JP | 2000-227813 A | 8/2000 |
| JP | 2000-251077 A | 9/2000 |
| JP | 2000-306095 A | 11/2000 |
| JP | 2000-326274 A | 11/2000 |
| JP | 2001-104050 A | 4/2001 |

* cited by examiner

IDENTIFICATION OF FACIAL IMAGE WITH HIGH ACCURACY

This application is a divisional of application 10/400,797 filed Mar. 28, 2003 now U.S. Pat. No. 7,248,721.

BACKGROUND OF THE INVENTION

1. Field of the Invention

The present invention relates to an apparatus for identifying a user by comparing a facial image of the user which is captured by a camera with facial image information which has been stored in advance.

2. Description of the Related Art

When a computer system or a robot system is used today by a plurality of users, each of the users may be required to be identified for authentication. Attention has been directed to a technique for identifying users based on facial image information. According to the technique, facial image information of certain users is preregistered in a facial image identifying apparatus, and when a user is to be identified, a facial image of the user is captured by a CCD camera, for example, and the captured facial image is checked against the preregistered facial image information to determine whether the user to be identified has been registered or not.

One conventional apparatus based on the facial image identifying technology is a robot apparatus disclosed in Japanese laid-open patent publication No. 2000-222576, for example.

FIG. 1 of the accompanying drawings is a block diagram of a conventional basic facial image identifying apparatus, and FIG. 2 of the accompanying drawings is a flowchart of an operation sequence of the conventional basic facial image identifying apparatus shown in FIG. 1.

As shown in FIG. 1, conventional basic facial image identifying apparatus 300 comprises image capturing means 301, person detecting means 302, person identifying means 303, and information presenting means 304.

Image capturing means 301 comprises a CCD camera, for example, for capturing an image including a user's face and a surrounding background. Person detecting means 302 detects a facial image from the image captured by image capturing means 301. Person identifying means 303, which has stored facial image information of preregistered users (hereinafter referred to as "registered users"), checks the facial image detected by person detecting means 302 against the stored facial image information, and identifies the user who has produced the detected facial image. The term "identifies" refers to a process of determining whether the user who has produced the detected facial image is a registered user or not. Information presenting means 304 presents the identified result from person identifying means 303 to the user.

A basic detecting and identifying process carried out by facial image identifying apparatus 300 will be described below with reference to FIG. 2.

Image capturing means 301 captures an image, and person detecting means 302 detects a user's facial image from the captured image. Person identifying means 303 checks the facial image against facial image information of registered users. In step 401, person identifying means 303 determines whether the facial image detected by person detecting means 302 is the facial image of a registered user or not. If the user is a registered user, then person identifying means 303 determines which one of the registered users the user is. If the detected facial image is not the facial image of a registered user, then the detecting and identifying process starts to be carried out again. If the detected facial image is the facial image of a registered user, then information presenting means 304 presents the identified result including information representative of the registered user to the user in step 402.

When images are captured in general home interior environments, it is difficult to keep image capturing conditions such as lighting conditions constant at all times. Therefore, it is highly likely to encounter different image capturing conditions when facial image information of registered users is captured and when a facial image of a user to be identified is captured.

For identifying a user, facial image identifying apparatus 300 simply checks the captured facial image of the user against the stored facial image information of registered users. With such a simple checking process, it is difficult for facial image identifying apparatus 300 to produce good identified results at all times in spite of different image capturing conditions.

Japanese laid-open patent publication No. 2000-306095 discloses a facial image checking and retrieving system as another conventional apparatus based on the facial image identifying technology.

The disclosed facial image checking and retrieving system operates as follows: When the facial image checking and retrieving system acquires a new facial image of a person, it estimates environment parameters and object state parameters of the acquired facial image. Then, the facial image checking and retrieving system adjusts parameters of stored facial image information to process images thereof so as to be closer to the acquired new facial image, thereby generating facial images to be checked against. Thereafter, the facial image checking and retrieving system checks the acquired new facial image against those generated facial images for identifying the person.

The detecting and identifying process carried out by the robot apparatus disclosed in Japanese laid-open patent publication No. 2000-222576 and the facial image checking and retrieving system disclosed in Japanese laid-open patent publication No. 2000-306095 suffer the following common problems:

Facial image information stored in the person identifying means and new captured facial images have to represent user's faces correctly. However, when the robot apparatus or the facial image checking and retrieving system is used in actual room interior environments or used by a plurality of users, user's facial images may not be acquired correctly. In particular, if a user to be identified does not know how to use the robot apparatus or the facial image checking and retrieving system properly, then it is impossible to provide desirable situations suitable for capturing a facial image, and hence a user's facial image cannot easily be identified.

The facial image checking and retrieving system disclosed in Japanese laid-open patent publication No. 2000-306095 also has the following drawbacks:

For the purpose of adjusting parameters of stored facial image information to process images thereof, the stored facial image information needs to be of sufficiently high quality. However, it is difficult to capture high-quality facial image information in room interior environments, for example.

If parameters of a new captured facial image exceed an adjustable range for the parameters of the stored facial image information, then those parameters cannot sufficiently be adjusted. As a consequence, the facial image checking and retrieving system fails to produce highly accurate identified results.

SUMMARY OF THE INVENTION

It is an object of the present invention to provide a facial image identifying apparatus which is capable of identifying a person highly accurately even in those situations which make it difficult to acquire a facial image with which to identify the person.

When a facial image identifying apparatus starts to detect a facial image, it determines whether a situation of an image captured by an image capturing means such as a camera or the like is appropriate to detect a facial image of an examinee user from the image or not. If the situation of the captured image is judged as being inappropriate to detect a facial image of the examinee user, then information representing that the situation is inappropriate to the examinee user.

Therefore, if the situation of the captured image is inappropriate to detect a facial image of the examinee user, then the examinee user can improve the situation based on the presented information. Even if situations for image acquisition are not constant such as in home interior environments or the examinee user is not accustomed to use the facial image identifying apparatus well, the inappropriate situation can easily be improved for increasing the probability of successful user identification.

If ambient brightness is not in a predetermined range, then the situation may be judged as being inappropriate to detect a facial image of the examinee user.

If the situation of the captured image is judged as being inappropriate to detect a facial image of the examinee user, then the image capturing means may be moved to automatically improve the situation.

If the face of the examinee user is protruded in all directions from the image, then the situation of the captured image may be judged as being inappropriate to detect a facial image of the examinee user, and the image capturing means may be moved backward.

If the face of the examinee user is protruded in a direction from the image, then the situation of the captured image may be judged as being inappropriate to detect a facial image of the examinee user, and the image capturing means may be moved in the direction.

If the face of the examinee user is protruded in a direction from the image, then the situation of the captured image may be judged as being inappropriate to detect a facial image of the examinee user, and an image capturing direction of the image capturing means may be changed in the direction.

If the face of the examinee user is protruded from the image, then the situation of the captured image may be judged as being inappropriate to detect a facial image of the examinee user, and an angle of view of the image capturing means may be increased.

If the situation of the captured image is judged as being inappropriate to detect a facial image of the examinee user, then a person detecting process and a person identifying process may be finished.

If ambient brightness is not in a predetermined range, then the situation may be judged as being inappropriate to determine whether the examinee user agrees with a registered user or not.

If the brightness of the face of the examinee user is not in a predetermined range, then the situation may be judged as being inappropriate to determine whether the examinee user agrees with a registered user or not.

If the face of the examinee user is in back-light, then the situation may be judged as being inappropriate to determine whether the examinee user agrees with a registered user or not.

If the face of the examinee user moves severely, then the situation may be judged as being inappropriate to determine whether the examinee user agrees with a registered user or not.

If the relative position of the face of the examinee user with respect to the image capturing means is not in a predetermined range, then the situation may be judged as being inappropriate to determine whether the examinee user agrees with a registered user or not, and the image capturing direction of the image capturing means may be changed to bring the relative position of the face of the examinee user with respect to the image capturing means into the predetermined range.

If the distance between the face of the examinee user and the image capturing means is not in a predetermined range, then the situation may be judged as being inappropriate to determine whether the examinee user agrees with a registered user or not, and the angle of view of the image capturing means may be changed to correct the distance between the face of the examinee user and the image capturing means.

Situations appropriate for person detection and person identification may be presented to the examinee user.

If a determined result is not obtained within a predetermined period of time, then the person detecting process and the person identifying process may be finished, and information representing that the person detecting process and the person identifying process are finished may be presented to the examinee user.

If a determined result is not obtained within a predetermined period of time and the person detecting process and the person identifying process are finished on account of the examinee user, then the examinee user may be requested to practice on the facial image identifying apparatus to better detect a facial image of the examinee user or better determine whether the examinee user agrees with a registered user or not.

If a determined result indicates that the examinee user does not agree with any registered user and information representing that the examinee user is a registered user is input, then facial image information of the examinee user may additionally be stored.

The above and other objects, features, and advantages of the present invention will become apparent from the following description with reference to the accompanying drawings which illustrate examples of the present invention.

DESCRIPTION OF THE PREFERRED EMBODIMENTS

1st Embodiment

Figure 1:
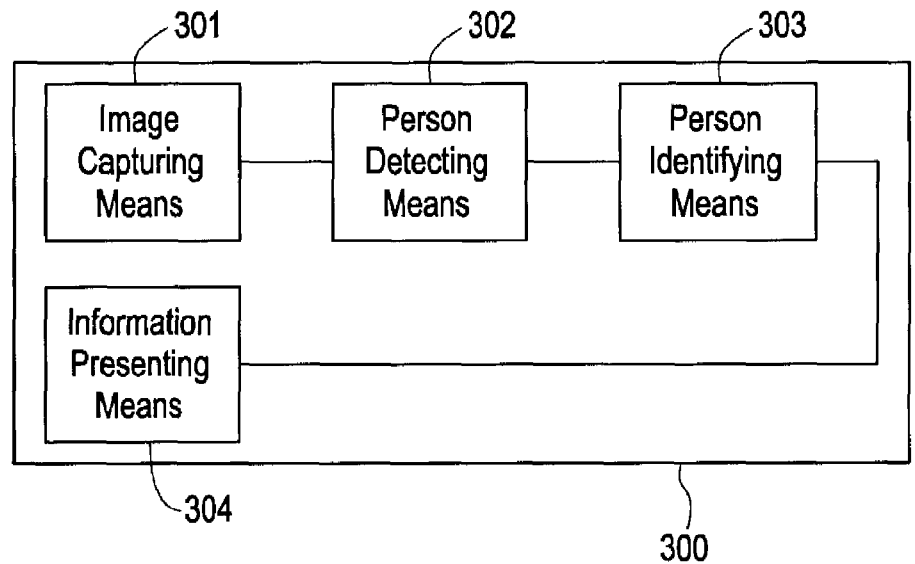
FIG. 1 is a block diagram of a conventional basic facial image identifying apparatus.
Figure 2:
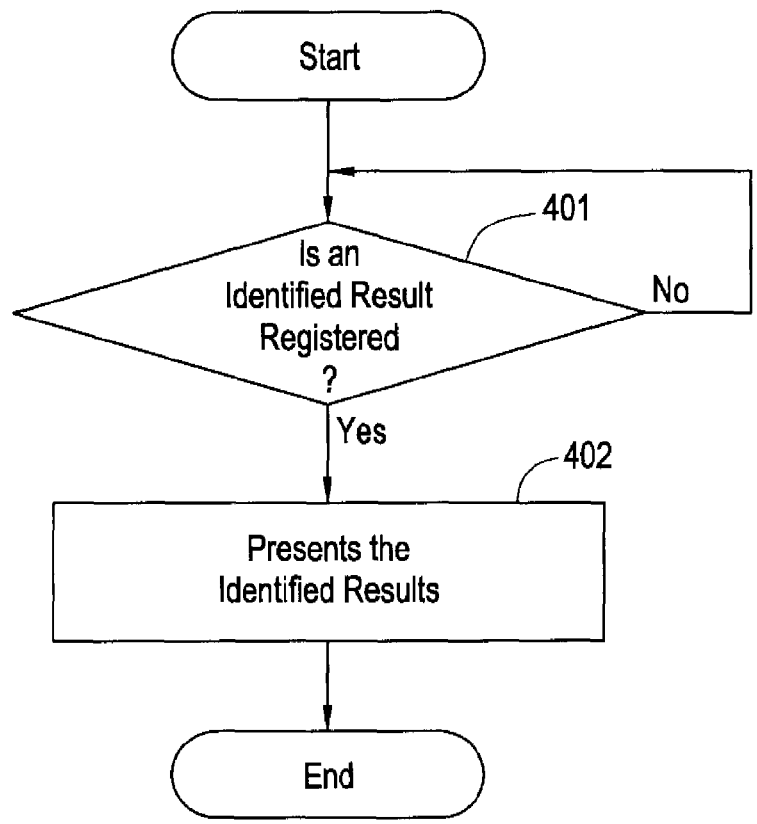
FIG. 2 is a flowchart of an operation sequence of the conventional basic facial image identifying apparatus shown in FIG. 1.
Figure 3:
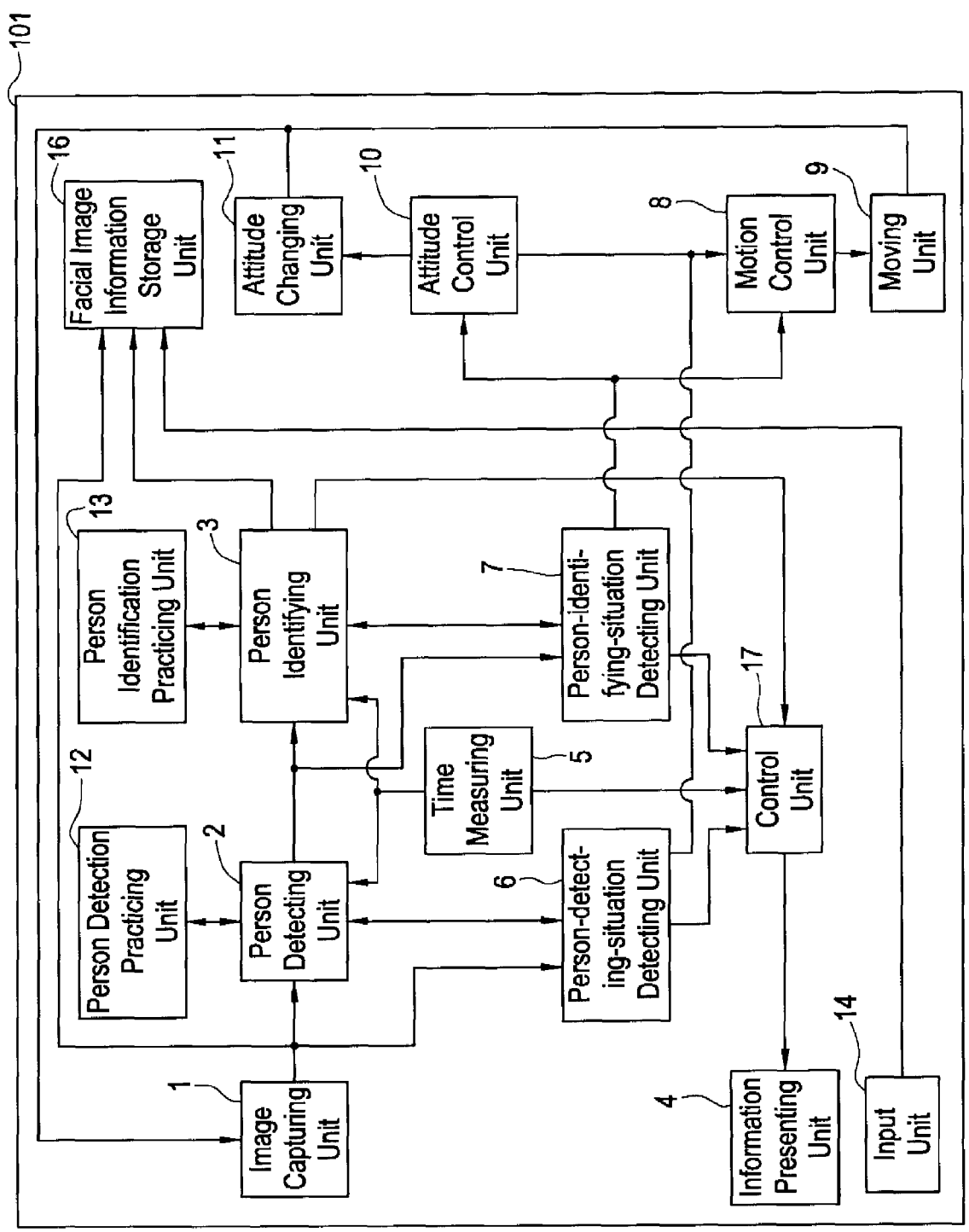
FIG. 3 is a block diagram of a facial image identifying apparatus according to a first embodiment of the present invention.

Referring now to FIG. 3, there is shown facial image identifying apparatus 101 according to a first embodiment of the present invention comprising image capturing unit 1, person detecting unit 2, person identifying unit 3, information presenting unit 4, time measuring unit 5, person-detecting-situation detecting unit 6, person-identifying-situation detecting unit 7, motion control unit 8, moving unit 9, attitude control unit 10, attitude changing unit 11, person detection practicing unit 12, person identification practicing unit 13, input unit 14, facial image information storage unit 16, and control unit 17.

Image capturing unit 1 comprises a video camera, a digital CCD camera, or the like, and captures a succession of still images from a scene containing a motion. For example, if facial image identifying apparatus 101 is switched into operation when a user to be identified (hereinafter referred to as "examinee user") is standing or sitting in front of image capturing unit 11, then image capturing unit 11 starts capturing an image including the face of the examinee user.

Person detecting unit 2 processes an image captured by image capturing unit 11, and determines whether a person is present in the captured image or not based on the size of the face, the positions of the eyes, etc., of a person which may be contained in the captured image. If a person is present in the captured image, then person detecting unit 2 detects a facial image from the captured image. The detection of a facial image with person detecting unit 2 will hereinafter be referred to as person detection. If the person detection is performed normally, then the detected facial image belongs to the examinee user.

When a user is to be registered, person identifying unit 3 stores facial image information representing a facial image which has been detected by person detecting unit 2 from an image captured by image capturing unit 1, into facial image information storage unit 16 in association with the user ID, the user name, etc. The user whose information including the facial image information, the user ID, etc., is stored in facial image information storage unit 16 is a registered user. When a person is to be identified, person identifying unit 3 compares a facial image of the person which has been detected by person detecting unit 2 with the facial image information of registered users which has been stored in facial image information storage unit 16. Person identifying unit 3 then determines whether the detected facial image agrees with the facial image of a registered user or not, and determines the facial image of which registered user coincides with the detected facial image. The determination of whether a facial image of a examinee user agrees with the facial image of a registered user or not, and the determination of the facial image of which registered user coincides with the facial image is referred to as person identification. If a facial image of a examinee user agrees with the facial image of a registered user, then person identifying unit 3 sends information, including a user ID, a user name, etc. of the registered user whose facial image has agreed with the facial image of the examinee user, as an identified result to information presenting unit 4. If a facial image of a examinee user does not agree with the facial image of a registered user, then person identifying unit 3 sends the facial image match failure as an identified result to information presenting unit 4.

Information presenting unit 4 presents video information displayed as images, characters, etc. on a display unit, and/or audio information radiated by a speaker, to the user.

Time measuring unit 5 uses a clock, for example, and calculates the difference between a start time which has been designated and the present time, thereby measuring a period of time which has elapsed from the designated start time to the present time.

Person-detecting-situation detecting unit 6 detects various parameters of situations of an image captured for person detection (hereinafter also referred to as "person detecting situations") from an image captured by image capturing unit 1, and determines whether the person detecting situations are appropriate for person detection based on the detected parameters. The parameters which serve as a basis for determining whether the person detecting situations are appropriate for person detection include, for example, ambient brightness, a face protruded out of the image, etc. If the ambient space is too bright, then the luminance of the image captured by image capturing unit 1 is saturated, i.e., the overall image is whitened, making it difficult to perform person detection. If the ambient space is too dark, then the luminance of the image captured by image capturing unit 1 is unduly lowered, i.e., the overall image is blackened, also making it difficult to perform person detection. Therefore, when the ambient brightness is in a predetermined range, the person detecting situations are appropriate for person detection. If a face is protruded out of the image captured by image capturing unit 1, then it is difficult to perform person detection. A face may be protruded out of the image captured by image capturing unit 1 when the face of the examinee user is positioned too high, for example, with respect to image capturing unit 1. Similarly, a face may be protruded out of the image captured by image capturing unit 1 when the face of the examinee user is positioned too low, too right, or too left with respect to image capturing unit 1. Moreover, a face may be protruded in its entirety out of the image because the face is positioned too close to image capturing unit 1. Therefore, when a face is not protruded out of the image captured by image capturing unit 1, then the person detecting situations are suitable for person detection.

Person-identifying-situation detecting unit 7 detects various parameters of situations of an image captured for person detection (hereinafter also referred to as "person identifying situations") from a facial image detected by person detecting unit 2, and determines whether the person identifying situations are appropriate for person identification based on the detected parameters. The parameters which serve as a basis for determining whether the person identifying situations are appropriate for person identification include, for example, face brightness, backlight of facial area, face motion severity, relative position of the face with respect to image capturing unit 1, etc. If the face is too bright, then the luminance of the facial image detected by person detecting unit 2 is saturated, losing feature quantities of the face and making it difficult to perform person identification. Feature quantities represent the values of various parameters contained in a facial image for featuring an individual. If the face is too dark, then the luminance of the facial image detected by person detecting unit 2 is unduly lowered, also losing feature quantities of the face and making it difficult to perform person identification. Therefore, when the face brightness is in a predetermined range, the person identifying situations are appropriate for person identification. If the face is in backlight, then since the difference between the face brightness and the back-ground brightness is large, and the face is too dark. The luminance of the facial image detected by person detecting unit 2 is unduly lowered, losing feature quantities of the face and making it difficult to perform person identification. Therefore, when the face is not in backlight, the person identifying situations are appropriate for person identification. Backlight of facial area is detected when the difference between the brightness of the face in the facial image detected by person detecting unit 2 and the brightness of another region in the facial image is in excess of a predetermined value. If the face moves severely, then the facial image detected by person detecting unit 2 becomes blurred, losing feature quantities of the face and making it difficult to perform person identification. If person detecting unit 2 detects a person using a face motion as a feature quantity, then person detecting unit 2 fails to detect the person stably when the face moves severely. Therefore, the supply of the facial image from person detecting unit 2 to person identifying unit 3 becomes unstable, making it difficult to perform person identification. Therefore, when face motion severity is below a predetermined level, the person identifying situations are appropriate for person identification. If the face of the examinee user is not positioned near the center of the image, then the face tends to be protruded out of the image when the examinee user moves even slightly. If the face can easily be protruded out of the image, then person detecting unit 2 detects the person unstably, and the supply of the facial image from person detecting unit 2 to person identifying unit 3 becomes unstable, making it difficult to perform person identification. Therefore, when the face of the examinee user is positioned within a predetermined range near the center of the image, the person identifying situations are appropriate for person identification. If the face of the examinee user is too far from image capturing unit 1, then the proportion of the facial image to the entire image is small, and the facial image is unclear. If the facial image is unclear, then since enough feature quantities are not available from the face, making it difficult to perform person identification. If the face of the examinee user is too close to image capturing unit 1, then the proportion of the facial image to the entire image is large. Consequently, the face tends to be protruded out of the image when the examinee user moves even slightly. If the face of the examinee user is too close to image capturing unit 1, then the facial image is likely to move a greater distance and become more blurred when the examinee user moves than if the face of the examinee user is too far from image capturing unit 1. Therefore, when the distance between the face of the examinee user and image capturing unit 1 falls in a predetermined range, the person identifying situations are appropriate for person identification.

Motion control unit 8 controls moving unit 9 in order to turn the image situations into situations appropriate for person detection or person identification based on the information of a detected result from person-detecting-situation detecting unit 6 or person-identifying-situation detecting unit 7. Specifically, motion control unit 8 calculates a distance that image capturing unit 1 is to move to achieve situations appropriate for person detection or person identification, and instructs moving unit 9 to move the calculated distance. For example, when person-detecting-situation detecting unit 6 detects a face protruded out of the image, or when person-identifying-situation detecting unit 7 detects an improper relative position of the face with respect to image capturing unit 1, motion control unit 8 controls moving unit 9 to improve the situations.

When instructed by motion control unit 8, moving unit 9 moves image capturing unit 1. For example, image capturing unit 1 can be moved forward, backward, leftward, and rightward with wheels mounted thereon, and moving unit 9 energizes a motor to rotate the wheels for thereby moving image capturing unit 1.

Attitude control unit 10 controls attitude changing unit 11 in order to turn the image situations into situations appropriate for person detection or person identification based on the information of a detected result from person-detecting-situation detecting unit 6 or person-identifying-situation detecting unit 7. Specifically, attitude control unit 10 calculates an attitude change that image capturing unit 1 is to make to achieve situations appropriate for person detection or person identification, and attitude changing unit 11 to achieve the calculated attitude change. For example, when person-detecting-situation detecting unit 6 detects a face protruded out of the image, or when person-identifying-situation detecting unit 7 detects an improper relative position of the face with respect to image capturing unit 1, attitude control unit 10 controls attitude changing unit 11 to improve the situations.

When instructed by attitude control unit 10, attitude changing unit 11 energizes a motor, for example, to change the image capturing direction (attitude) of image capturing unit 1, i.e., the direction of the camera of image capturing unit 1, upward, downward, leftward, or rightward.

Facial image identifying apparatus 101 according to the present embodiment has a function to allow a examinee user to practice thereon for carrying out acceptable person detection and person identification. In practicing on facial image identifying apparatus 101 for person detection, the examinee user faces image capturing unit 1, and operates facial image identifying apparatus 101 to perform a person detection practice. Facial image identifying apparatus 101 counts events of person detection that have been carried out within a predetermined period of time. If at least a predetermined number of events of person detection have properly been carried out within the predetermined period of time, then the person detection for the examinee user is judged as acceptable. In practicing on facial image identifying apparatus 101 for person identification, the examinee user also faces image capturing unit 1, and operates facial image identifying apparatus 101 to perform a person identification practice. Facial image identifying apparatus 101 counts events of person identification that have been carried out within a predetermined period of time. If at least a predetermined number of events of person identification have properly been carried out within the predetermined period of time, then the person identification for the examinee user is judged as acceptable. While the person detection practice and the person identification practice may be carried out separately, they should preferably be performed simultaneously.

Person detection practicing unit 12 has a function for an examinee user to practice thereon for person detection, and determines whether person detection can be performed with a level of skill that is high enough for the examinee user to use facial image identifying apparatus 101. For example, person detection practicing unit 12 calculates the number of events of person detection that have properly been carried out within a predetermined period of time in a person detection practice, and determines whether the calculated number of events of person detection is large enough for the examinee user to use facial image identifying apparatus 101. The determined result may be presented to the examinee user from information presenting unit 4.

Person identification practicing unit 13 has a function for an examinee user to practice thereon for person identification, and determines whether person identification can be performed with a level of skill that is high enough for the examinee user to use facial image identifying apparatus 101. For example, person identification practicing unit 13 calculates the number of events of person identification that have properly been carried out within a predetermined period of time in a person identification practice, and determines whether the calculated number of events of person identification is large enough for the examinee user to use facial image identifying apparatus 101. The determined result may be presented to the examinee user from information presenting unit 4.

Input unit 14 serves as an interface for an examinee user to enter information such as the user ID, the user name, etc. Input unit 14 includes a keyboard for entering information with keys, and may also include a microphone for entering information with sound.

Control unit 17 controls information presenting unit 4 in response to the detected results from person identifying unit 3 and person-detecting-situation detecting unit 6 and person-detecting-situation detecting unit 7, and the measured period of time from time measuring unit 5.

Figure 4:
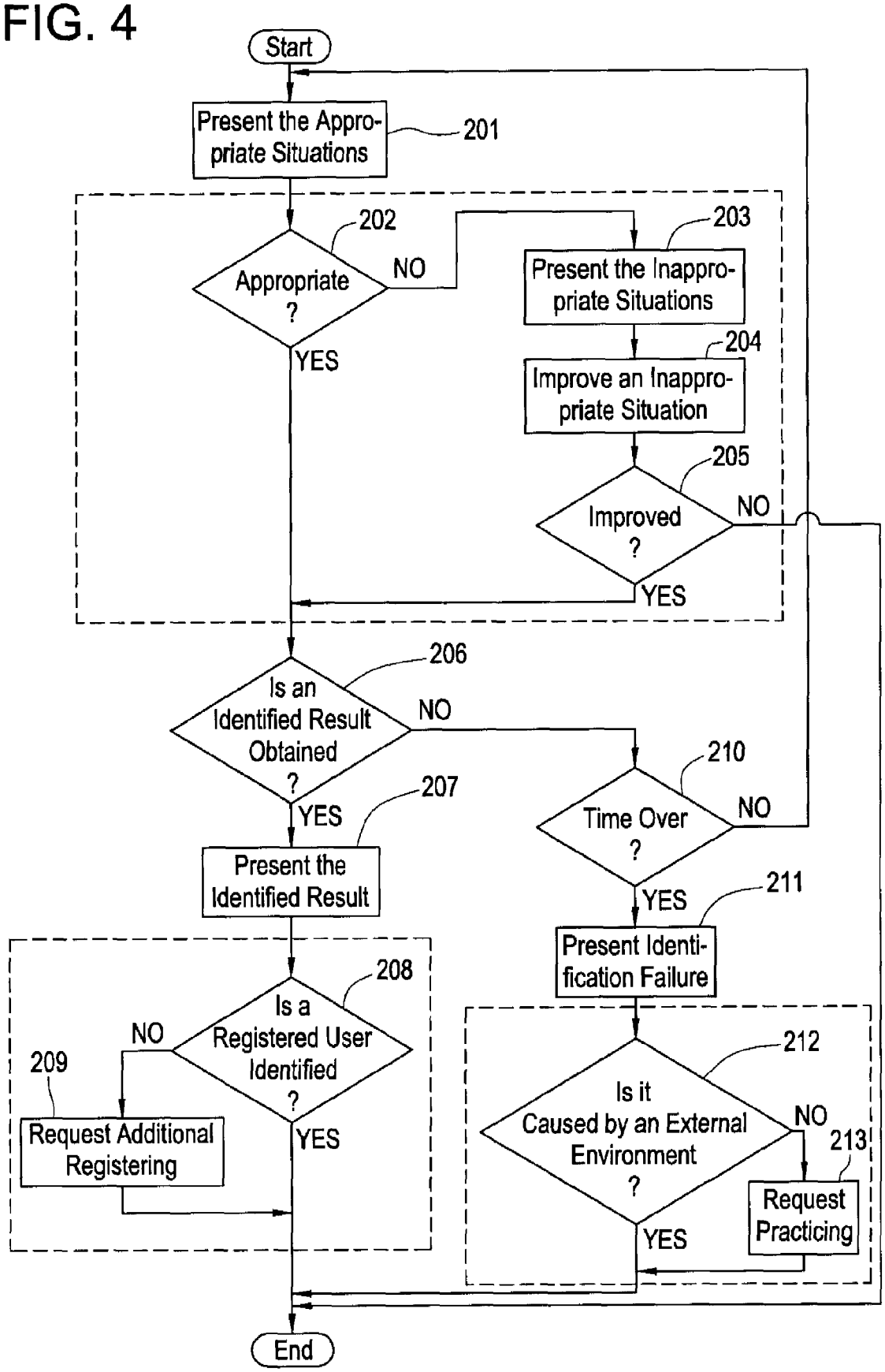
FIG. 4 is a flowchart of a person identifying process carried out by the facial image identifying apparatus according to the first embodiment of the present invention.

Operation of facial image identifying apparatus 101 according to the first embodiment will be described below with reference to FIG. 4. An examinee user comes in front of image capturing unit 1, and facial image identifying apparatus 101 starts to operate. In step 201, information presenting unit 4 presents situations appropriate for person detection and person identification to the examinee user. Once person detecting and person identifying processes are initially started, they are continuously carried out until the operation sequence shown in FIG. 4 is put to an end. Time measuring unit 5 starts measuring elapsed time when a person detecting process and a person identifying process are started. Time measuring unit 5 may start measuring elapsed time from the time when person detecting unit 2 begins a person detecting process, or may start measuring elapsed time from the time when person identifying unit 3 begins a person identifying process. Situations appropriate for person detection and person identification include ambient and face brightness, face motion, and relative position of the face of the to-be-identifier user with respect to image capturing unit 1, which are appropriate for person detection and person identification. Information presenting unit 4 presents information which represents all or at least one of these situations, in the form of images, sounds, characters, etc., to the examinee user.

Then, facial image identifying apparatus 101 performs a situation detection improving process. In step 202, person-detecting-situation detecting unit 6 determines whether person detecting situations are inappropriate for person detection or not, and person-identifying-situation detecting unit 7 determines whether person identifying situations are inappropriate for person identification or not. If person-detecting-situation detecting unit 6 or person-identifying-situation detecting unit 7 judges the situations as being inappropriate, then information presenting unit 4 is controlled by control unit 7 to present the inappropriate situations to the examinee user, and warn the examinee user, in step 203. At this time, information presenting unit 4 may present an improvement proposal as well as the situations and the warning.

The situations detected by person-detecting-situation detecting unit 6 include, for example, ambient brightness, a face protruded upward from an image capturing range of image capturing unit 1, a face protruded downward from the image capturing range of image capturing unit 1, a face protruded leftward from the image capturing range of image capturing unit 1, a face protruded rightward from the image capturing range of image capturing unit 1, and a face protruded in its entirety from the image capturing range of image capturing unit 1. All of these situations or at least one of these situations may be presented to the examinee user.

The situations detected by person-identifying-situation detecting unit 7 include, for example, face brightness, backlight of facial area, face motion severity, relative position of the face with respect to image capturing unit 1, etc. All of these situations or at least one of these situations may be presented to the examinee user.

In step 204, motion control unit 8 controls moving unit 9 or attitude control unit 10 controls attitude changing unit 11 to improve an inappropriate situation. For example, if a face protruded in its entirety from the image capturing range of image capturing unit 1 is detected by person-detecting-situation detecting unit 6, then motion control unit 8 controls moving unit 9 to retract image capturing unit 1 away from the examinee user. If a face protruded upward from the image capturing range of image capturing unit 1 is detected by person-detecting-situation detecting unit 6, then motion control unit 8 controls moving unit 9 to retract image capturing unit 1 away from the examinee user. If a face protruded downward from the image capturing range of image capturing unit 1 is detected by person-detecting-situation detecting unit 6, then motion control unit 8 controls moving unit 9 to advance image capturing unit 1 away from the examinee user. If the relative position of the face with respect to image capturing unit 1 is detected as being leftward of a suitable position by person-identifying-situation detecting unit 7, then motion control unit 8 controls moving unit 9 to move image capturing unit 1 to the left. Similarly, if the relative position of the face with respect to image capturing unit 1 is detected as being rightward of the suitable position by person-identifying-situation detecting unit 7, then motion control unit 8 controls moving unit 9 to move image capturing unit 1 to the right. If the distance between image capturing unit 1 and the face is detected as being smaller than a suitable distance by person-identifying-situation detecting unit 7, then motion control unit 8 controls moving unit 9 to retract image capturing unit 1 from the examinee user. Similarly, if the distance between image capturing unit 1 and the face is detected as being larger than the suitable distance by person-identifying-situation detecting unit 7, then motion control unit 8 controls moving unit 9 to advance image capturing unit 1 toward the examinee user. If a face protruded upward from the image capturing range of image capturing unit 1 is detected by person-detecting-situation detecting unit 6, then attitude control unit 10 controls attitude changing unit 11 to change the attitude of image capturing unit 1 upward. If a face protruded downward from the image capturing range of image capturing unit 1 is detected by person-detecting-situation detecting unit C, then attitude control unit 10 controls attitude changing unit 11 to change the attitude of image capturing unit 1 downward. If a face protruded leftward from the image capturing range of image capturing unit 1 is detected by person-detecting-situation detecting unit 6, then attitude control unit 10 controls attitude changing unit 11 to change the attitude of image capturing unit 1 leftward. If a face protruded rightward from the image capturing range of image capturing unit 1 is detected by person-detecting-situation detecting unit 6, then attitude control unit 10 controls attitude changing unit 11 to change the attitude of image capturing unit 1 rightward. If the relative position of the face with respect to image capturing unit 1 is detected as being leftward of the suitable position by person-identifying-situation detecting unit 7, then attitude control unit 10 controls attitude changing unit 11 to change the attitude of image capturing unit 1 leftward. Similarly, if the relative position of the face with respect to image capturing unit 1 is detected as being rightward of the suitable position by person-identifying-situation detecting unit 7, then attitude control unit 10 controls attitude changing unit 11 to change the attitude of image capturing unit 1 rightward.

Facial image identifying apparatus 101 may be configured to improve an inappropriate situation with either one of moving unit 9 or attitude changing unit 11.

Thereafter, in step 205, person-detecting-situation detecting unit 6 and person-identifying-situation detecting unit 7 determine whether the inappropriate situation has been improved or not. If the inappropriate situations have not been improved, control unit 17 controls information presenting unit 4 to notify the examinee user of the failure to improve the inappropriate situation, after which the operation sequence shown in FIG. 4 is put to an end. Person-detecting-situation detecting unit 6 judges an inappropriate situation as failing to be improved, for example, when a facial image cannot be detected because the ambient brightness is not in a predetermined range and this situation is not improved by a warning issued to the examinee user or by motion control unit 8 and attitude control unit 10. Person-identifying-situation detecting unit 7 judges an inappropriate situation as failing to be improved, for example, when the examinee user cannot be detected because the ambient brightness is not in a predetermined range and this situation is not improved by a warning issued to the examinee user or by motion control unit 8 and attitude control unit 10. Person-identifying-situation detecting unit 7 judges an inappropriate situation as failing to be improved, for example, when the examinee user cannot be detected because the face of the examinee user is in backlight and this situation is not improved by a warning issued to the examinee user or by motion control unit 8 and attitude control unit 10. Likewise, any other inappropriate situations are judged as failing to be improved when they are not improved by a warning issued to the examinee user or by motion control unit 8 and attitude control unit 10.

If inappropriate situations for person detection and person identification are not detected in step 202 or if inappropriate situations are judged as being improved in step 205, then person detecting unit 2 performs a person detecting process on the examinee user, and person identifying unit 3 performs a person identifying process on the examinee user and determines whether an identified result is obtained or not in step 206. An identified result is obtained if the examinee user agrees with one of the registered users or does not agree with either one of the registered users. Therefore, an identified result is obtained not only when a registered user is identified as the examinee user, but also when a registered user is not identified as the examinee user and the examinee user is judged as an unregistered user.

If the person identifying process cannot be started because the person detecting process is not properly completed, or if person identifying process is not properly completed though the person detecting process is properly performed, then no identified result is obtained. For example, no identified result is obtained when a facial image is not properly obtained or a sufficient number of facial images of sufficient quality for person identification are not acquired.

After an identified result is obtained, information presenting unit 4 presents the identified result to the examinee user in step 207.

Then, facial image identifying apparatus 101 carries out an additional registration requesting process. In the additional registration requesting process, control unit 17 determines whether a registered user is identified as the examinee user or not in step 208. A registered user is not identified as the examinee user if the examinee user is judged as an unregistered user though a facial image is captured well and a person identifying process is properly completed. If a registered user is identified as the examinee user, then facial image identifying apparatus 101 finishes its person identifying process. If a registered user is not identified as the examinee user, then control unit 17 controls information presenting unit 4 to request the examinee user to register additional facial image information in step 209. Additional facial image information is registered by capturing a facial image of the examinee user with image capturing unit 1 and recording the captured facial image in facial image information storage unit 16 in association with information including the user ID, the user name, etc., entered from input unit 4.

If no identified result is obtained in step 206, then control unit 17 determines in step 210 whether the elapsed time from the start of the person identifying process, as measured by time measuring unit 5, has exceeded a predetermined period of time or not. If the elapsed time has not exceeded the predetermined period of time, then the processing goes back to step 201.

If the elapsed time has exceeded the predetermined period of time, resulting in time-out, control unit 17 controls information presenting unit 4 to present a person detection or identification failure to the examinee user in step 211.

After information presenting unit 4 has presented the person detection or identification failure to the examinee user, facial image identifying apparatus 101 performs a practice requesting process. In the practice requesting process, control unit 17 determines in step 212 whether the person detection or identification failure is caused by an external environment or not. For example, if an inappropriate situation detected by person-detecting-situation detecting unit 6 or person-identifying-situation detecting unit 7 is caused by a parameter related to light, e.g., ambient brightness, face brightness, or backlight of facial area, then control unit 17 judges that the person detection or identification failure is caused by to an external environment. If an inappropriate situation detected by person-detecting-situation detecting unit 6 or person-identifying-situation detecting unit 7 is caused by a face protruded out of the image, face motion severity, or relative position of the face with respect to image capturing unit 1, then the person detection or identification failure is considered as having to do with the manner in which the examinee user uses facial image identifying apparatus 101.

If the person identification failure is judged as not being caused by an external environment, then control unit 17 determines that the examinee user has a problem, and controls information presenting unit 4 to request the examinee user to practice for person detection and person identification in step 213.

In a person detection practice, person detection practicing unit 12 trains the examinee user for a proper person detecting process by having the examinee user detected a predetermined number of times within a predetermined period of time, for example. In a person identification practice, person identification practicing unit 13 trains the examinee user for a proper person identifying process by having the examinee user identified a predetermined number of times within a predetermined period of time, for example.

The person identifying process of facial image identifying apparatus 101 shown in FIG. 4 is a preferred operation sequence according to the present invention. However, it is sufficient for the person identifying process according to the present invention to include at least one of the situation detection improving process (steps 202 through 205), the additional registration requesting process (steps 208, 209), and the practice requesting process (steps 212, 213).

If the person identifying process lacks the practice requesting process, then steps 210, 211 may be dispensed with, and the processing may return to step 201 when no identified result is judged as being obtained in step 206.

In the person identifying process of facial image identifying apparatus 101 shown in FIG. 4, the situation detection improving process (steps 202 through 205) and the time-out check (step 210) are carried out in the person detecting process and the person identifying process. However, the situation detection improving process and the time-out check may also be carried out in the user registering process. A user may be registered using a plurality of items of facial image information, and various items of facial image information may be acquired according to a process similar to step 204. If such a user registering process fails while in progress, then the failure may be presented to the examinee user and the facial image information acquired up to the point of failure may be discarded.

With facial image identifying apparatus 101 according to the first embodiment, as described above, person-detecting-situation detecting unit 6 or person-identifying-situation detecting unit 7 monitors image situations to determine whether they are appropriate for person detection or person identification or not. If the image situations are inappropriate for person detection or person identification, then attempts are made to improve the inappropriate image situations by having information presenting unit 4 present information to the examinee user, having motion control unit 8 control the position of image capturing unit 1, and having attitude control unit 10 control the direction of image capturing unit 1. If the inappropriate image situations are not improved by those attempts and are caused by the manner in which the examinee user uses facial image identifying apparatus 101, then the examinee user is requested to practice with facial image identifying apparatus 101. As a consequence, the image situations which are inappropriate for person detection or person identification are improved into image situations which are appropriate for person detection or person identification, increasing the accuracy of person identification.

2nd Embodiment

Figure 5:
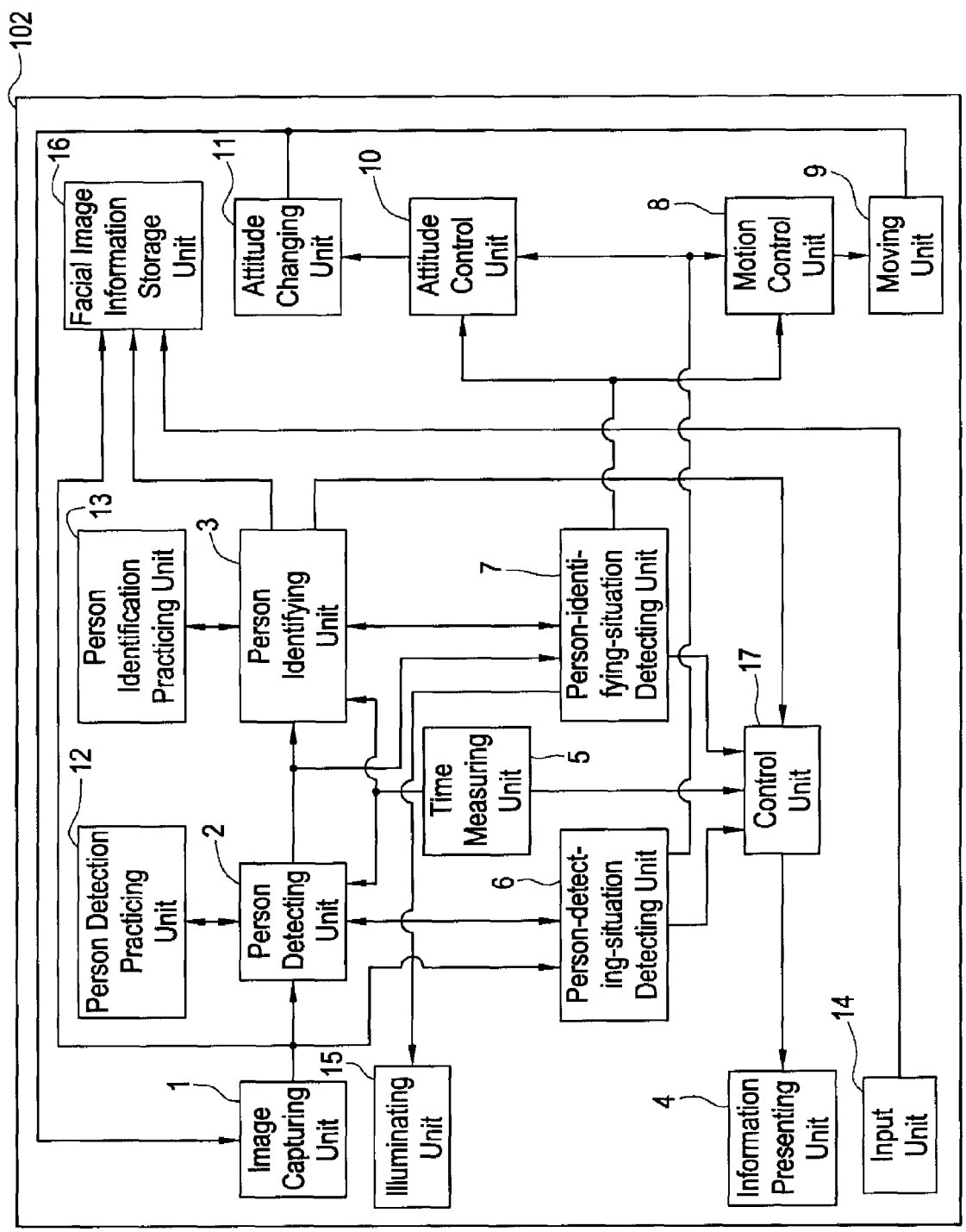
FIG. 5 is a block diagram of a facial image identifying apparatus according to a second embodiment of the present invention.

FIG. 5 shows in block form facial image identifying apparatus 102 according to a second embodiment of the present invention. As shown in FIG. 5, facial image identifying apparatus 102 according to the second embodiment is similar to facial image identifying apparatus 101 according to the first embodiment except that it additionally has illuminating unit 15. Illuminating unit 15 comprises a light, a strobe, or the like for illuminating the image capturing range of image capturing unit 1. Other details of facial image identifying apparatus 102 according to the second embodiment are identical to those of facial image identifying apparatus 101 according to the first embodiment, and will not be described below.

A person identifying process of facial image identifying apparatus 102 is essentially the same as the person identifying process of facial image identifying apparatus 101, except that it additionally has the following operation sequence:

If person-detecting-situation detecting unit 6 detects an insufficient level of ambient brightness, for example, in step 204 shown in FIG. 4, then illuminating unit 15 illuminates the image capturing range of image capturing unit 1. If person-identifying-situation detecting unit 7 detects a dark face of the examinee user in step 204, then illuminating unit 15 illuminates the image capturing range of image capturing unit 1. If person-identifying-situation detecting unit 7 detects a face of the examinee user in backlight, then illuminating unit 15 illuminates the image capturing range of image capturing unit 1.

With facial image identifying apparatus 102 according to the second embodiment, as described above, if the brightness of the face is not sufficient due to back-light or illumination shortage, then illuminating unit 15 illuminates the image capturing range of image capturing unit 1. Consequently, image situations inappropriate for person detection and person identification are improved, increasing the accuracy of person identification.

3rd Embodiment

Figure 6:
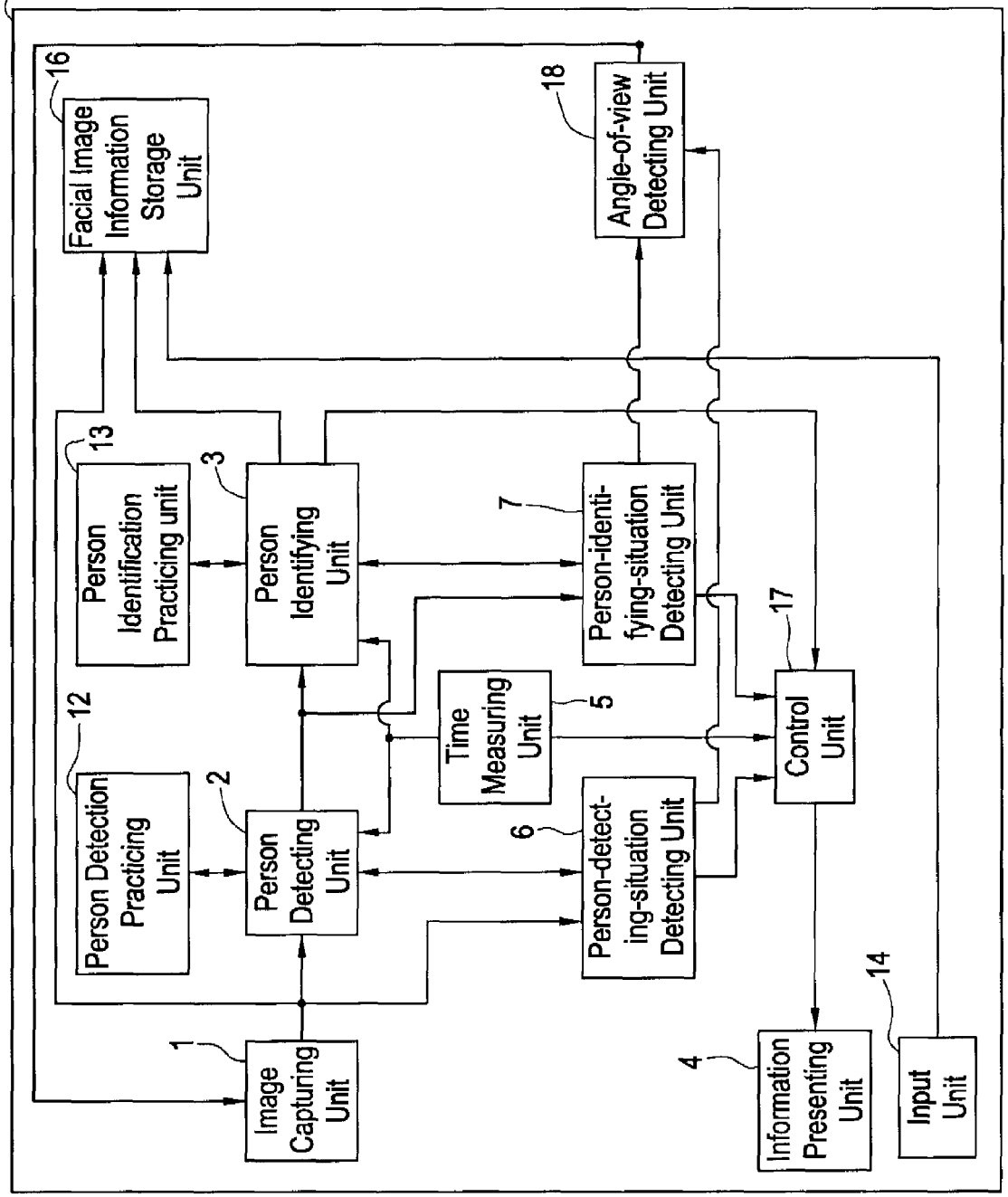
FIG. 6 is a block diagram of a facial image identifying apparatus according to a third embodiment of the present invention.

FIG. 6 shows in block form facial image identifying apparatus 103 according to a third embodiment of the present invention. As shown in FIG. 6, facial image identifying apparatus 103 according to the third embodiment differs from facial image identifying apparatus 101 according to the first embodiment in that motion control unit 8, moving unit 9, attitude control unit 10, and attitude changing unit 11 are dispensed with, and angle-of-view adjusting unit 18 is added.

Angle-of-view adjusting unit 18 enlarges or reduces the image capturing range of image capturing unit 1 by adjusting the angle of view of a zoom lens used in image capturing unit 1 from a wide angle setting to a telephoto setting. Other details of facial image identifying apparatus 103 according to the third embodiment are identical to those of facial image identifying apparatus 101 according to the first embodiment, and will not be described below.

Facial image identifying apparatus 103 according to the third embodiment carries out a person detecting process and a person identifying process in the same manner as facial image identifying apparatus 101 according to the first embodiment. However, facial image identifying apparatus 103 operates in step 204 as follows:

In step 204 shown in FIG. 4, if a face protruded in its entirety from the image capturing range of image capturing unit 1 is detected by person-detecting-situation detecting unit 6, then angle-of-view adjusting unit 18 enlarges the image capturing range. If a face protruded upward from the image capturing range of image capturing unit 1 is detected by person-detecting-situation detecting unit 6, then angle-of-view adjusting unit 18 enlarges the image capturing range. If a face protruded downward from the image capturing range of image capturing unit 1 is detected by person-detecting-situation detecting unit 6, then angle-of-view adjusting unit 18 enlarges the image capturing range. If a face protruded leftward from the image capturing range of image capturing unit 1 is detected by person-detecting-situation detecting unit 6, then angle-of-view adjusting unit 18 enlarges the image capturing range. If a face protruded rightward from the image capturing range of image capturing unit 1 is detected by person-detecting-situation detecting unit 6, then angle-of-view adjusting unit 18 enlarges the image capturing range. If the distance between image capturing unit 1 and the face is detected as being smaller than a suitable distance by person-identifying-situation detecting unit 7, then angle-of-view adjusting unit 18 enlarges the image capturing range to correct the distance. Similarly, if the distance between image capturing unit 1 and the face is detected as being larger than a suitable distance by person-identifying-situation detecting unit 7, then angle-of-view adjusting unit 18 reduces the image capturing range to correct the distance.

Facial image identifying apparatus 103 according to the third embodiment is free of motion control unit 8, moving unit 9, attitude control unit 10, and attitude changing unit 11 which are included in facial image identifying apparatus 101 according to the first embodiment. However, facial image identifying apparatus 103 according to the third embodiment may include motion control unit 8, moving unit 9, attitude control unit 10, and attitude changing unit 11 as well as angle-of-view adjusting unit 18.

With facial image identifying apparatus 103 according to the third embodiment, as described above, if the face is protruded from the image capturing range of image capturing unit 1 or if the distance between image capturing unit 1 and the face is not appropriate, then angle-of-view adjusting unit 18 adjusts the image capturing range of image capturing unit 1. Consequently, image situations inappropriate for person detection and person identification are improved, increasing the accuracy of person identification.

The processing operation of the facial image identifying apparatus according to each of the above embodiments may be carried out by recording a program for performing the functions of the processing operation in a computer-readable recording medium, reading the program thus recorded into a computer, and executing the program on the computer. The computer-readable recording medium may refer to a recording medium such as a floppy disk, a magneto-optical disk, a CD-ROM, or the like, or a recording medium such as a hard disk drive incorporated in a computer system. The computer-readable recording medium may also refer to a medium for dynamically holding a program for a short period of time, e.g., a transmission medium or a transmission wave, for use in applications for transmitting the program through the Internet, or a medium for holding the program for a certain period of time, e.g., a volatile memory in a computer system which operates as a server in such applications.

While preferred embodiments of the present invention have been described in specific terms, such description is for illustrative purposes only, and it is to be understood that changes and variations may be made without departing from the spirit or scope of the following claims.

What is claimed is:

1. A facial image identifying apparatus comprising:
image capturing means for continuously capturing an image including the face of an examinee user;
person detecting means for detecting a facial image of said examinee user from the image captured by said image capturing means;
facial image information storage means for storing, in advance, facial image information of at least one registered user;
person identifying means for comparing said facial image detected by said person detecting means with the facial image information stored in said facial image information storage means to determine whether said examinee user agrees with any of said registered users;
person-detecting-situation detecting means for determining whether a situation of the image captured by said image capturing means is appropriate for said person detecting means to detect a facial image of said examinee user from said image or not;
angle-of-view adjusting means for changing an angle of view of said image capturing means to make said situation appropriate to detect a facial image of said examinee user if said situation is inappropriate to detect a facial image of said examinee user, as determined by said person-detecting-situation detecting means; and
information presenting means for presenting, to said examinee user, a determined result as to whether said examinee user agrees with any of said registered users, as determined by said person identifying means.

2. A facial image identifying apparatus according to claim 1, wherein said person-detecting-situation detecting means comprises means for judging said situation as being inappropriate to detect a facial image of said examinee user if the face of said examinee user is protruded out of said image, and said angle-of-view adjusting means comprises means for increasing the angle of view of said image capturing means if said situation is inappropriate to detect a facial image of said examinee user.

3. A facial image identifying apparatus according to claim 1, wherein said information presenting means comprises means for presenting, to said examinee user, situations appropriate for said person detecting means to detect a facial image of said examinee user and for said person identifying means to determine whether said examinee user agrees with any of said registered users, before said person detecting means starts to operate.

4. A facial image identifying apparatus according to claim 1, wherein each of said person detecting means and said person identifying means comprises means for finishing operation thereof if said determined result is not obtained within a predetermined period of time, and said information presenting means comprises means for presenting, to said examinee user, the finishing of operation of said person detecting means and said person identifying means.

5. A facial image identifying apparatus according to claim 4, further comprising:
practicing means for requesting said examinee user to practice for said person detecting means to better detect a facial image of said examinee user and for said person identifying means to better determine whether said examinee user agrees with any of said registered users, if said determined result is not obtained and operation of said person detecting means and said person identifying means is finished on account of said examinee user.

6. A facial image identifying apparatus according to claim 1, wherein said person identifying means comprises means for additionally recording facial image information of said examinee user in said facial image information storage means if said examinee user does not agree with any of said registered users and if information indicating that said examinee user is a registered user is entered into said person identifying means.

7. A facial image identifying apparatus comprising:
image capturing means for continuously capturing an image including the face of an examinee user;
person detecting means for detecting a facial image of said examinee user from the image captured by said image capturing means;

facial image information storage means for storing, in advance, facial image information of at least one registered user;

person identifying means for comparing said facial image detected by said person detecting means with the facial image information stored in said facial image information storage means to determine whether said examinee user agrees with any of said registered users;

person-identifying-situation detecting means for determining whether a situation of the image captured by said image capturing means is appropriate for said person identifying means to determine whether said examinee user agrees with any of said registered users;

angle-of-view adjusting means for changing an angle of view of said image capturing means to make said situation appropriate if said situation is inappropriate for said person identifying means to determine whether said examinee user agrees with any of said registered users, as determined by said person-identifying-situation detecting means; and information presenting means for presenting, to said examinee user, a determined result as to whether said examinee user agrees with any of said registered users, as determined by said person identifying means.

8. A facial image identifying apparatus according to claim 7, wherein said person-identifying-situation detecting means comprises means for judging said situation as being inappropriate for said person identifying means to determine whether said examinee user agrees with any of said registered users if the relative position of the face of said examinee user with respect to said image capturing means is not in a predetermined range, and said angle-of-view adjusting means comprises means for changing the angle of view of said image capturing means to correct the distance between said image capturing means and said examinee user if said situation is inappropriate for said person identifying means to determine whether said examinee user agrees with any of said registered users.

9. A computer program product, including computer-readable media comprising instructions for enabling a computer to compare a facial image of an examinee user captured by image capturing means with a facial image of at least one registered user which is stored in advance in storage means thereby to identify said examinee user, said instructions comprising:

a first instruction set for continuously capturing an image including the face of an examinee user;

a second instruction set for detecting a facial image of said examinee user from the captured image;

a third instruction set for comparing the detected facial image with the facial image information stored in said storage means to determine whether said examinee user agrees with any of said registered users;

a fourth instruction set for determining whether a situation of the image captured by said image capturing means is appropriate to detect a facial image of said examinee user from said image or not;

a fifth instruction set for operating angle-of-view adjusting means for adjusting an angle of view of said image capturing means to make said situation appropriate if said situation is judged as being inappropriate to detect a facial image of said examinee user; and a sixth instruction set for presenting, to said examinee user, a determined result as to whether said examinee user agrees with any of said registered users if said determined result is obtained.

10. A computer program product, including computer-readable media comprising instructions for enabling a computer to compare a facial image of an examinee user captured by image capturing means with a facial image of at least one registered user which is stored in advance in storage means thereby to identify said examinee user, said instructions comprising:

a first instruction set for continuously capturing an image including the face of an examinee user;

a second instruction set for detecting a facial image of said examinee user from the captured image;

a third instruction set for comparing the detected facial image with the facial image information stored in said storage means to determine whether said examinee user agrees with any of said registered users;

a fourth instruction set for determining whether a situation of the image captured by said image capturing means is appropriate to determine whether said examinee user agrees with any of said registered users or not;

a fifth instruction set for operating angle-of-view adjusting means for adjusting an angle of view of said image capturing means to make said situation appropriate if said situation is judged as being inappropriate to determine whether said examinee user agrees with any of said registered users; and a sixth instruction set for presenting, to said examinee user, a determined result as to whether said examinee user agrees with any of said registered users if said determined result is obtained.

* * * * *